May 23, 1933.    J. R. COFFMAN    1,910,947
VALVE STRUCTURE
Filed Nov. 5, 1931    2 Sheets-Sheet 1

INVENTOR.
John R. Coffman.
BY
ATTORNEYS.

May 23, 1933.  J. R. COFFMAN  1,910,947
VALVE STRUCTURE
Filed Nov. 5, 1931  2 Sheets-Sheet 2

INVENTOR.
John R. Coffman.
BY
ATTORNEYS.

Patented May 23, 1933

1,910,947

UNITED STATES PATENT OFFICE

JOHN R. COFFMAN, OF COLUMBUS, OHIO, ASSIGNOR TO JOHN J. KLISE, OF WOOSTER, OHIO

VALVE STRUCTURE

Application filed November 5, 1931. Serial No. 573,227.

My invention relates to valve structures. It relates, more particularly, to a novel type of valve for high pressure and temperature operation embodying means for lubricating the valve plug and its seat and means for limiting the extent of longitudinal movement of the valve plug in its seat. This valve is suitable for use in connection with oil, gas and steam lines wherein a high pressure is maintained although it will be understood that it is not limited thereto.

Heretofore, difficulty has been experienced in providing a system whereby the valve plug and its seat could be thoroughly lubricated or coated with a rust preventative at all times and under all conditions. As a result of this, the valve parts would be subjected to wear or would corrode, which would ultimately preclude the efficient seating of the plug and would therefore allow the valve to leak.

Furthermore, in prior art valves there has been no means for limiting the extent to which the valve plug could be "broken out" from its seat and withdrawn to the proper degree of clearance. As a result of this, the valve plug could be raised to a comparatively great distance from its seat, thereby allowing large particles of dirt, rust and other extraneous material to be admitted between the valve plug and its seat where such material would lodge and prevent subsequent efficient seating of the plug.

One of the objects of my invention is to provide a valve for high temperature and pressure operation wherein the valve plug and seat will be adequately and positively lubricated at all times or will be provided with a coating of a rust preventative.

Another object of my invention is to provide a valve structure for high temperature and pressure operation wherein the pilot of the plug will be thoroughly lubricated at all times or will be coated with a rust preventative at all times.

Another object of this invention is to provide a valve structure wherein the raising of the plug is limited to a predetermined extent.

This invention preferably contemplates the provision of a valve structure that is equipped for high pressure, force feed lubrication to the valve seat of the plug and to the pilot and its bearing. The plug is provided with ducts or grooves arranged longitudinally of the plug body and on opposing sides thereof at points adjacent the port opening therethrough. These ducts are adapted to cooperate with corresponding grooves formed in the valve seat and will register with the grooves in the valve seat when the valve plug is in closed position. Rotation of the valve plug from closed to open position, or from open to closed position causes the grooves in the plug to wipe the lubricant, contained in such grooves, across the valve seat. Such rotation will also cause the grooves in the valve seat to wipe the lubricant, contained in such grooves, on the surface of the plug. The pilot is also provided with a groove which prevents suction on its lower end and which provides for the thorough and positive lubrication thereof.

This invention also contemplates the provision of a raising and seating nut which is so mounted on the upper end of the stem that by rotating such nut the valve plug may be moved towards or from its seat. This nut is also provided with a stop member which can be adjusted to allow the plug to be elevated to a preselected height only.

One of the advantageous features of my invention lies in the fact that none of the grooves in the plug are exposed to the line pressure during the rotation of the plug and are always protected by the walls of the valve seat. However, the exterior surface of the plug is subjected to full line pressure at intervals, especially when the plug is rotated to a closed position, which resultantly removes the lubricant from the surface of the plug. The lubricant carrying grooves in the valve seat are therefore so positioned that when the plug is rotated from closed to open position, lubricant will be again applied to the surface of the plug which was exposed to the line pressure.

Another advantageous feature of my invention is the provision of the stop member which will allow the valve plug to be raised to a preselected extent only, thereby ensuring that the plug will not be raised too much and allow foreign matter such as dirt to become lodged between the valve plug and its seat.

The preferred embodiment of my invention is shown in the accompanying drawings wherein similar characters of reference designate corresponding parts and wherein.

Figure 1:
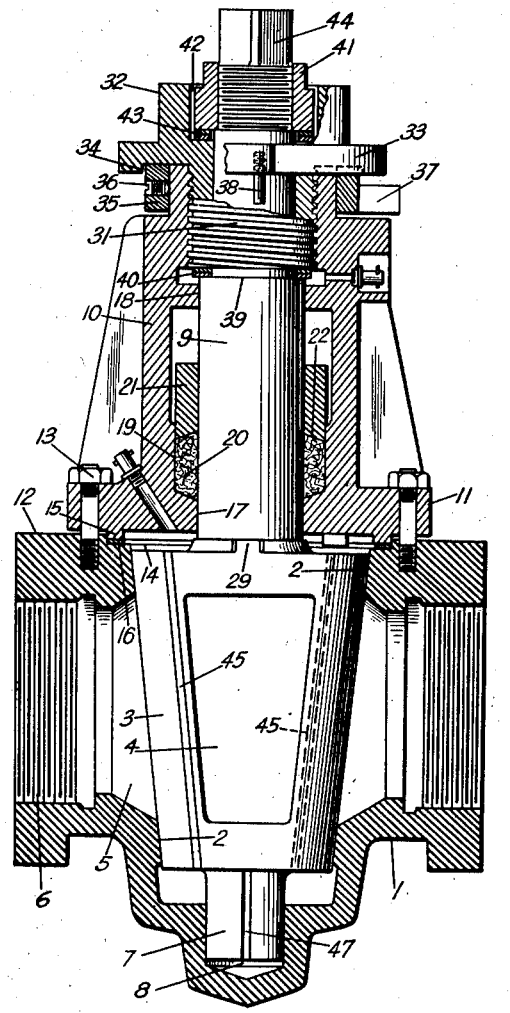
Figure 1 is a longitudinal sectional view of the preferred embodiment of my valve structure showing the plug thereof wedged in closed position.

With reference to the drawings, I have shown the preferred embodiment of my valve structure as comprising a body portion or casing 1, that is preferably forged from a billet of suitable metal. This casing is provided with a vertical tapering bore 2. This bore is circular in cross section and is adapted to form an inverted frustro-conical valve chamber for the reception of a tapering valve plug 3.

This valve plug 3 is equipped with a horizontal cross bore 4 that is so formed therein that proper rotation of the valve plug will bring it into alignment with the horizontal longitudinal bore 5 formed in the casing. The cooperation of these two bores will permit the flow of fluid through the valve, such fluid being conducted thereto by pipes which are screwed into the threaded portion 6.

The plug 3 is further equipped with a cylindrical depending guide post 7, that is adapted to be disposed in a vertical bore 8 that is formed in the casing 1 at the lower end of the tapering bore 2. The cooperation of the guide 7 and the vertical bore 8 is for the purpose of maintaining the plug 3 in proper alignment with the bore 2 to allow positive engagement of their respective contacting surfaces after the plug has been lowered into place.

The valve plug 3 is also equipped with an upstanding cylindrical stem 9. This stem is formed integrally with the upper surface of the plug. The valve stem 9 serves as a means for raising and lowering the valve plug 3 and for rotating it in the bore 2. The valve stem is rotatably mounted in a bonnet member 10 and is longitudinally movable therein, in a manner to be hereinafter fully explained.

The bonnet member 10 is provided with a flange 11, that is adapted to be mounted on a substantially horizontal surface 12 encircling the upper end of the bore 2 and formed as a part of the casing 1. This bonnet is bolted on the casing 1 by means of stud bolts 13. In order to secure a leak proof connection between these two surfaces, a cut-out portion 14 is provided in the surface 12 and this cut-out portion is adapted to receive a projecting ring 15 formed on the lower surface of the bonnet member 10. A circular gasket 16 of any suitable material may be inserted between the ring 15 and cutaway portion 14. Thus, when the stud bolts 13, that are arranged adjacent the periphery of the flange 11 are drawn tight, the bonnet will be mounted on the casing in such a manner as to preclude the escape of fluid through the connection therebetween.

The bonnet member 10 is provided with a lower bearing 17 in which the lower end of the stem 9 is adapted to reciprocate and rotate. Another bearing 18 similar to the bearing 17 is provided for the valve stem at a point adjacent the upper end of the bonnet member. The bonnet 10 is further provided with a chamber 19 formed in the lower end thereof and encircling the valve stem. This chamber is adapted to receive packing material 20 which will lie intermediate the stem and the wall of the chamber 19. A packing gland 21 is mounted above this packing material and in surrounding relation to the valve stem. This packing gland is beveled as at 22 in opposition to the lower beveled wall of the chamber 19 for a purpose that will be readily apparent. The packing gland 21 is held in place by means of bolts 23, Figure 3, whose lower ends are suitably mounted in members 24 formed on the flange 11. The upper ends of these bolts pass through slots 25 formed in lugs 26 which extend from the packing gland 21 through the open portions 27 which are formed in each side of the bonnet member 10.

The lower surface of the bonnet member 10 is further provided with the two depending stop pins 28 that are formed integrally therewith. These stops are adapted to cooperate with an upstanding member 29 formed on the upper face of the plug 3 and are so arranged that one of the stops will contact with the upstanding member at the instant the plug reaches open or closed position, thus precluding further rotation of the plug past either of these positions. In this manner, the operator of the valve will be immediately notified of the positions of the valve when such resistance to further rotation thereof is set up.

The bonnet member 10 is further provided at its upper end with an enclosed chamber 30. The inner wall of this chamber is threaded to receive a threaded cylindrical shank 31 of a raising and seating nut 32 that is bored centrally to allow the stem to extend therethrough. This nut 32 is adapted to raise the stem and to lower it, as will be hereinafter fully described.

This nut preferably comprises a shank portion 31 that is threaded into the chamber 30, as previously mentioned, and has a flange 33 projecting therefrom. This flange has a downwardly projecting shoulder 34 which is adapted to overlap a collar 35 mounted on the bonnet in surrounding relation to the upper end of the outside wall of the chamber 30. The collar 35 is adjustable on the bonnet and may be secured in any adjusted position by means of a set screw 36. This collar is further provided with a stop 37 which is integrally formed therewith. This stop is adapted to cooperate with a stop pin 38 which depends from the flange 33 and is threaded into a socket therein. Thus it will be seen that the stop pin 38 and cooperating stop 37 will limit the extent of rotation of nut 32. Furthermore, it will be understood that the extent of its rotation may be varied by adjusting the collar 35.

The valve stem 9 is provided with a shoulder 39 on which the lower end of the nut 32 will exert a downward pressure when the nut is rotated in the proper direction. A thrust washer 40 may be interposed between this shoulder and the lower end of the nut 32. It will be understood that by rotating the nut 32 in the proper direction, the shank 31 of the nut 32 will be moved downwardly which will result in a longitudinal movement of the stem and will wedge the plug 3 in the bore 2.

Mounted on the stem 9, directly above the raising and seating nut 32, is a thrust nut 41 which is disposed in a socket 42 formed on the upper end of the nut 32. A thrust washer 43 is disposed between the thrust nut 41 and the nut 32. The nut 41 is threaded onto the upper end of the stem 9 and rotation of the raising and seating nut 32 in the proper direction will cause an upward thrust on the nut 41 and will thereby raise the plug 3 from the seat 2. The upper end of the stem 9 is squared as at 44 for the reception of a wrench by which this stem may be rotated in order to open or close the valve.

Figure 4:
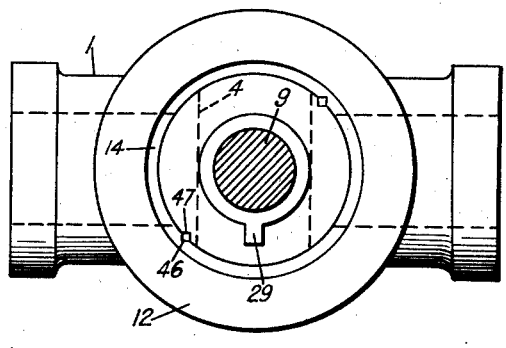
Figure 4 is a section taken on line 4—4 of Figure 2.
Figure 5:
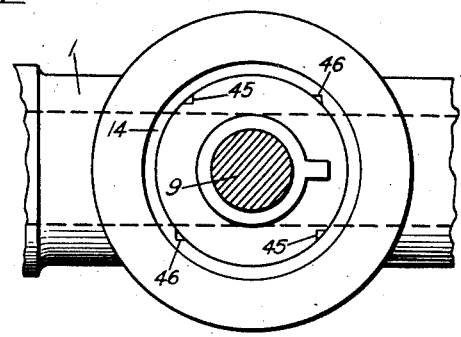
Figure 5 is a section taken on line 5—5, Figure 3.

I have also provided a means for lubricating the plug 3 and its seat and a means for lubricating the pilot of the valve. This means comprises grooves 45 which are formed in the valve plug and extend longitudinally thereof. I have shown two grooves but it will be understood that more may be used if desirable. However, it is important to so position these grooves that they will not be subject to line pressure when the valve is in open or closed position as shown in Figures 4 and 5. A plurality of grooves 46 are formed in the valve seat and these grooves are adapted to correspond with grooves 45 when the valve is in closed position (Figure 5).

I further provide a groove 47 that extends longitudinally of the pilot 7. By means of this groove the pilot 7 and its bearing may be easily lubricated and this groove will also prevent suction on the lower end of the pilot, as will be readily understood.

I have provided a duct 48 in the lower part of the bonnet 10 and this duct is provided with a fitting 49 at its outer end on which a device for feeding a lubricant into the valve, by means of pressure, may be fitted. When the lubricant is forced through the duct 48 it will pass around the upper part of the valve plug and will then pass down into the channels formed in the valve plug and in the valve seat. The lubricant will then pass down below the valve plug and will flow into the groove 47 which is formed in the pilot 7.

Rotation of the valve plug from closed to open position or from open to closed position will cause the groove 45 in the plug to wipe the lubricant, contained therein, across the wall of the valve chamber. Such rotation will also cause the grooves 46 in the valve seat to wipe the lubricant, contained in such groove, on the surface of the plug. The lubrication between the plug and the seat further acts as a sealing medium and prevents leakage of fluid between these members.

Figure 2:
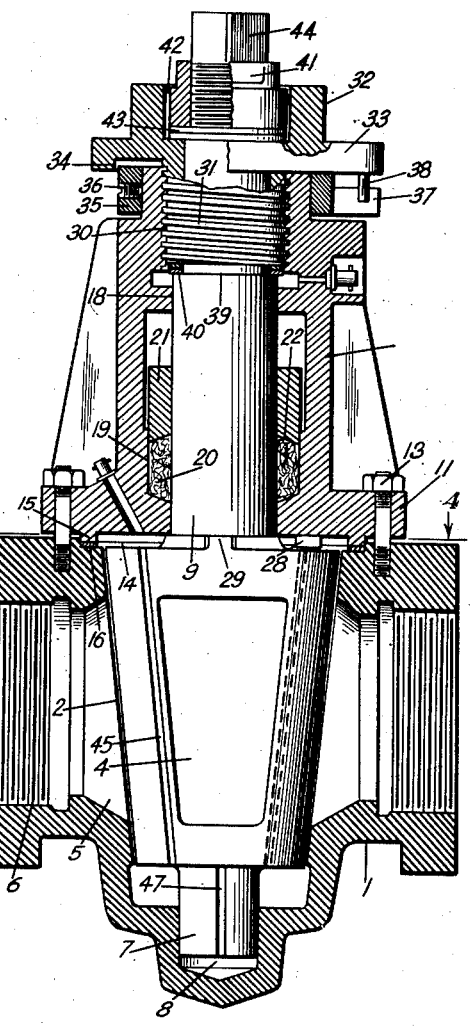
Figure 2 is a view similar to Figure 1 showing the plug of my valve structure raised from its seat preparatory to rotation from closed to open position.
Figure 6:
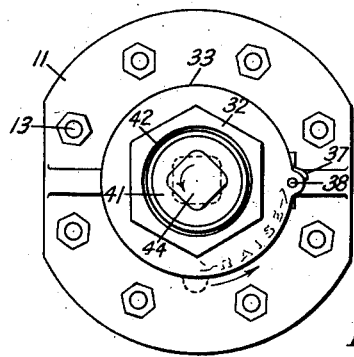
Figure 6 is a plan view of the valve when the plug is in the position shown in Figure 2.

In the operation of my device it will be noted that the valve plug is shown in closed position in Figure 1. In this position the exterior surface of the valve plug will intimately contact with the wall of the bore 2. When it is desired to rotate the valve plug from closed to open position, the plug is first elevated or raised to the position shown in Figure 2.

In order to do this, the raising and seating nut 32 is rotated in a counter-clockwise direction which will cause this nut to move upwardly through its threaded engagement with the chamber 30. This upward movement of the nut 32 will exert a thrusting action on the nut 41 and will thereby cause the stem 9 to move upwardly and to raise the plug 3 from its seat. However, this upward movement is regulated by means of the stop pin 38 and cooperating stop 37 which will prevent the raising of the plug past a predetermined point. In this manner the valve may be adjusted so that the plug can be raised only a slight distance from its seat in order to preclude the entrance of dirt or other extraneous material between this valve plug and its seat.

Figure 3:
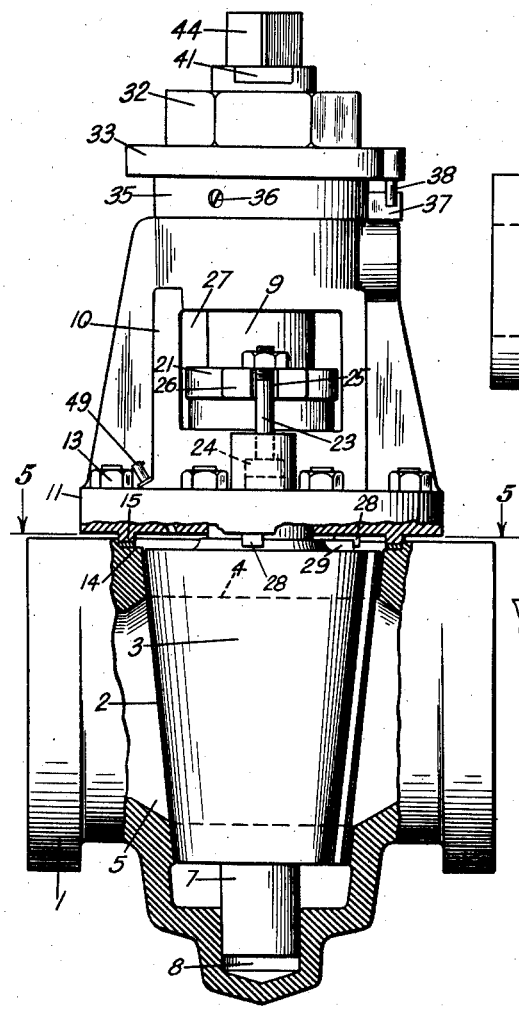
Figure 3 is a view similar to Figures 1 and 2 showing the plug in open position and wedged into the valve seat.

To bring the plug into its open position as shown in Figure 3, a wrench is fitted over the upper end of the valve stem and by this means the valve stem may be rotated to bring the cross bore 4 of the plug in line with the openings in the casing. During this operation the valve plug is still in raised position.

To again lower the plug, the raising and seating nut 32 is rotated in a clock-wise direction. This rotation of the nut will cause the lower surface of the nut to exert a thrusting action on the shoulder 39 of the valve stem and will thereby force the plug down onto its seat.

The valve stem and cooperating parts may be lubricated by lubricant which is fed through a fitting 49 and around the valve stem, as indicated above. Instead of supplying the valve plug and its seat with a lubricant, it may be supplied with some form of rust preventative. It will be apparent that the valve plug and seat will be constantly supplied with such a substance and that all the surfaces thereof will be constantly coated with such substance.

Having thus described my invention, what I claim is:

1. A plug valve comprising a housing, a valve seat, a plug cooperatively mounted with relation to said valve seat, a stem and pilot for said plug, a means for rotating said plug, means for raising and lowering said plug with relation to said valve seat, said means comprising a member freely rotatable upon said stem and operative by such rotation to raise or lower said plug, means operably connected to said member for regulating the distance which said plug may be raised from its seat, and means for lubricating said plug and its seat and said pilot.

2. A plug valve comprising a housing, a valve seat, a plug cooperatively mounted with relation to said valve seat, a stem and pilot for said plug, a means for rotating said plug, means for raising and lowering said plug with relation to said valve seat, said means comprising a member freely rotatable upon said stem and operative by such rotation to raise or lower said plug, means operably connected to said member adjustable angularly in a plane at right angles to the axis of said stem for regulating the distance which said plug may be raised from its seat, and means for lubricating said plug and its seat and said pilot.

3. A plug valve comprising a housing, a valve seat, a plug cooperatively mounted with relation to said valve seat, a means for rotating said plug, means for raising and lowering said plug with relation to said valve seat, said means comprising a member freely rotatable upon said stem and operative by such rotation to raise or lower said plug, means operably connected to said member for regulating the distance which said plug may be raised from its seat, and means embodying longitudinal extending grooves formed in said plug and said seat and a longitudinal extending groove formed in said pilot for lubricating said plug and its seat and said pilot.

4. A plug valve comprising a housing, a valve seat, a plug cooperatively mounted with relation to said valve seat, an apertured yoke secured to said housing, a stem and pilot for said plug, said stem projecting through said yoke, means for raising and lowering said plug with relation to said valve seat embodying a member mounted upon the upper end of said yoke freely rotatable upon said stem and operative by such rotation to raise or lower said plug, means operably connected to said member comprising a depending stop on said member and a cooperating stop member on said yoke for regulating the distance which said plug may be raised from its seat, and means for lubricating said plug and its seat and said pilot.

5. A plug valve comprising a housing, a valve seat, a plug cooperatively mounted with relation to said valve seat, an apertured yoke secured to said housing, a stem and pilot for said plug, said stem projecting through said yoke, a means for rotating said plug, means for raising and lowering said plug with relation to said valve seat embodying a member mounted upon the upper end of said yoke freely rotatable upon said stem and operative by such rotation to raise or lower said plug, means operably connected to said member comprising a depending stop on said member and a cooperating stop member on said yoke for regulating the distance which said plug may be raised from its seat, and means embodying longitudinal extending grooves formed in said plug and said seat and a longitudinal extending groove formed in said pilot for lubricating said plug and its seat and said pilot.

In testimony whereof, I hereby affix my signature.

JOHN R. COFFMAN.